No. 739,496.                                                    Patented September 22, 1903.

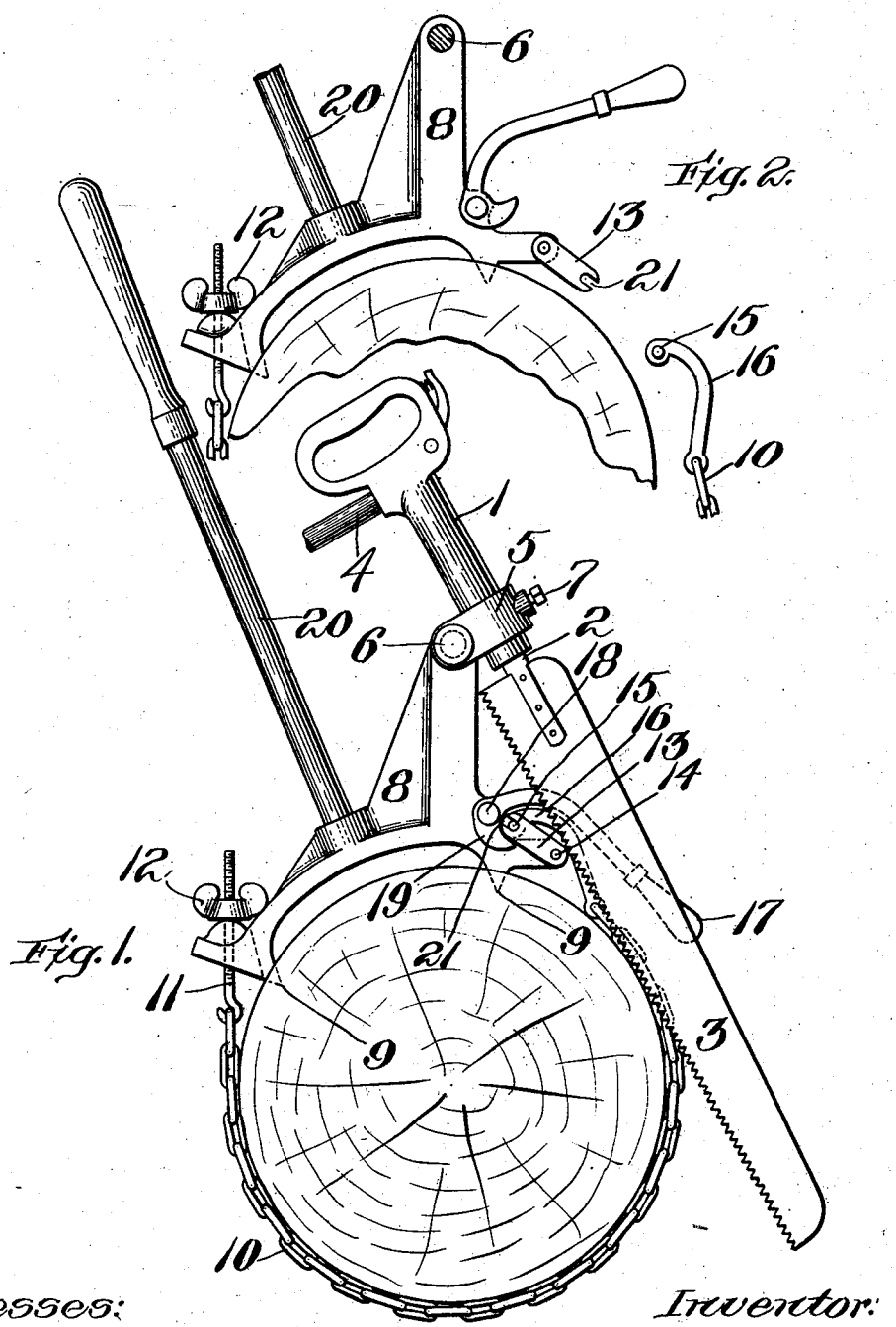

UNITED STATES PATENT OFFICE.

WELLINGTON PARKER KIDDER, OF BOSTON, MASSACHUSETTS, ASSIGNOR TO FRANK H. GOODYEAR AND GEORGE E. MATTHEWS, TRUSTEES, OF BOSTON, MASSACHUSETTS.

DRAG-SAW.

SPECIFICATION forming part of Letters Patent No. 739,496, dated September 22, 1903.

Application filed October 4, 1902. Serial No. 126,001. (No model.)

*To all whom it may concern:*

Be it known that I, WELLINGTON PARKER KIDDER, a citizen of the United States, residing at Boston, in the county of Suffolk and State of Massachusetts, have invented certain new and useful Improvements in Drag-Saws, of which the following is a specification, reference being had therein to the accompanying drawings.

Figure 1 is a plan view of my new drag-saw applied to a tree-trunk, shown in cross-section. Fig. 2 is a detailed view showing various parts in a different position from the position in which the parts are shown in Fig. 1.

The object of my invention is to produce a pneumatically-operated drag-saw which may be readily mounted in operative contiguity to a tree trunk or limb.

In the drawings illustrating the principle of my invention and the best mode now known to me of applying the same, 1 represents the handle and pneumatic chamber; 2, the longitudinally-reciprocating piston; 3, the saw, and 4 the air-inlet of an ordinary and well-known pneumatic saw.

In accordance with my invention I inclose the handle 1 in a bracket 5, which is pivoted at 6 to a part to be described. Bracket 5, which encircles the handle 1 and through which the handle may be moved lengthwise, so as to adjust the pneumatic saw in the bracket, is provided with a set-screw or other clamping device 7, whereby the saw-handle may be locked in any desired position between its ends in said bracket. That part 8 to which the bracket 5 is pivoted may be called a "tree-engaging" dog and is formed with points 9, which may be driven into the trunk. The opposite ends of the dog are secured by a chain 10, which, with the dog, encircles the tree-trunk. The connections between the dog and chain 10 are preferably as shown—that is, one end of the dog is provided with an orifice through which the threaded shank 11 of a hook passes to receive the adjusting-nut 12.

The other end portion of the dog supports a link 13, which is pivoted at one end 14 to the dog. To the other or outer end of the link 13 is pivoted at 15 in an open slot of link 13 another link 16, to one end of which chain 10 is secured. By moving the outer end of the link 13 inwardly toward the trunk that end of the link 16 which is pivoted to the link 13 is moved nearer the tree-trunk, so that the chain 10 is tightened thereon, and further tightening of the chain may be effected by turning the nut 12. A handle-lever 17 is pivoted at 18 on the dog 8 and is provided with a cam-shaped end 19, which when the outer end of the handle-lever 17 is moved outwardly strikes against the outer end of the link 13 and so loosens up the chain.

20 is a handle connected with the dog 8 for easier manipulation of the dog. The open slot referred to in the outer end of link 13 is marked 21. Its purpose is to effect the ready disconnection of the link 16 from the link 13, so that link 16 and chain 10 may be released from the trunk and the apparatus removed.

It will be observed from Fig. 1 that the saw 3 is above the handle 17, the dog 8, and chain 10, so that the apparatus is held as fixed on what ultimately becomes the stump. It will also be seen that an outward pull on the handle 17 will cause the cam 19 to straighten out the coöperating links 13 and 16 by moving the outer end of the link 13 outwardly, and thereby carrying the outer end of the link 16 away from the tree-trunk. At a certain time in this movement the open slot 21 discharges the pivot-pin 15 of the link 16, as is sufficiently shown in Fig. 2. The outward pull on the outer end of the handle 17 automatically uncouples the link mechanism 13 and 16. By this construction the drag-saw may be very quickly applied and disengaged.

What I claim is—

1. The combination of a tree-engaging bracket with a chain connected, at one end, to the bracket, and provided, at its other end, with a link; another link pivoted on said bracket; a handle having a cam and pivoted on said bracket; said links being formed with a detachable connection.

2. The combination of a tree-engaging bracket with a chain connected, at one end, to the bracket, and provided, at its other end, with a link; another link pivoted on said bracket; a handle having a cam and pivoted on said bracket; said links being formed with a detachable connection; and said bracket having an arm provided with a saw-holding bracket pivoted thereon.

In testimony whereof I affix my signature in presence of two witnesses.

WELLINGTON PARKER KIDDER.

Witnesses:
E. A. ALLEN,
M. E. COVENEY.